US010379364B2

(12) United States Patent
Takahashi

(10) Patent No.: US 10,379,364 B2
(45) Date of Patent: Aug. 13, 2019

(54) HEAD-MOUNTED DISPLAY

(71) Applicant: Brother Kogyo Kabushiki Kaisha, Nagoya-shi, Aichi-ken (JP)

(72) Inventor: Hiromasa Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 122 days.

(21) Appl. No.: 15/454,065

(22) Filed: Mar. 9, 2017

(65) Prior Publication Data

US 2017/0176756 A1 Jun. 22, 2017

Related U.S. Application Data

(63) Continuation of application No. PCT/JP2015/075560, filed on Sep. 9, 2015.

(30) Foreign Application Priority Data

Sep. 12, 2014 (JP) .................................. 2014-187100

(51) Int. Cl.
*G02B 27/14* (2006.01)
*G02B 27/01* (2006.01)

(52) U.S. Cl.
CPC .. *G02B 27/0176* (2013.01); *G02B 2027/0159* (2013.01); *G02B 2027/0169* (2013.01)

(58) Field of Classification Search
CPC .................................................. G02B 27/0176
USPC ........................................................ 359/632
See application file for complete search history.

(56) References Cited

U.S. PATENT DOCUMENTS

2012/0002046 A1 1/2012 Rapoport et al.
2015/0054717 A1 2/2015 Sugihara et al.

FOREIGN PATENT DOCUMENTS

| EP | 899599 A2 | 3/1999 |
|---|---|---|
| EP | 1202566 A1 | 5/2002 |
| JP | H09-318905 A | 12/1997 |
| JP | H11-142782 A | 5/1999 |
| JP | 2001-330794 A | 11/2001 |

(Continued)

OTHER PUBLICATIONS

Dec. 1, 2015—International Search Report—Intl App PCT/JP2015/015560.

(Continued)

*Primary Examiner* — James C. Jones
(74) *Attorney, Agent, or Firm* — Banner & Witcoff, Ltd.

(57) ABSTRACT

A head-mounted display includes a mounting fixture mounted on a user's head, an image display device including an image light unit that generates image light, a half mirror, and a casing, a connection fixture that mounts the image display device with respect to the mounting fixture, a first ball joint that connects the mounting fixture and the connection fixture, and a second ball joint that connects the image display device and the connection fixture. The connection fixture holds the image display device in front of a user's eyes. The second ball joint extends in right and left directions, and rotatably supports the image display device with respect to the connection fixture in a state in which a rotational axis, disposed on a rear side of the image display device, is set as a supporting point. The second ball joint changes a direction of image light that is emitted.

7 Claims, 12 Drawing Sheets

(56) References Cited

FOREIGN PATENT DOCUMENTS

| JP | 2004-078057 A | 3/2004 | | |
|---|---|---|---|---|
| JP | 2004-080679 A | 3/2004 | | |
| JP | 2004-233778 A | 8/2004 | | |
| JP | 2004-236102 A | 8/2004 | | |
| JP | 2010-226680 A | 10/2010 | | |
| JP | 2004078057 | * 3/2011 | ............ | G02B 27/02 |
| JP | 2012-105117 A | 5/2012 | | |
| JP | 2013-044828 A | 3/2013 | | |
| JP | 2013-175947 A | 9/2013 | | |
| JP | 2013-238813 A | 11/2013 | | |

OTHER PUBLICATIONS

Mar. 14, 2017—(WO) IPRP & Written Opinion—Intl App PCT/JP2015/075560, Eng Tran.

Apr. 25, 2018—(EP) Extended European Search Report—App 15840953.2.

* cited by examiner

FIG. 5
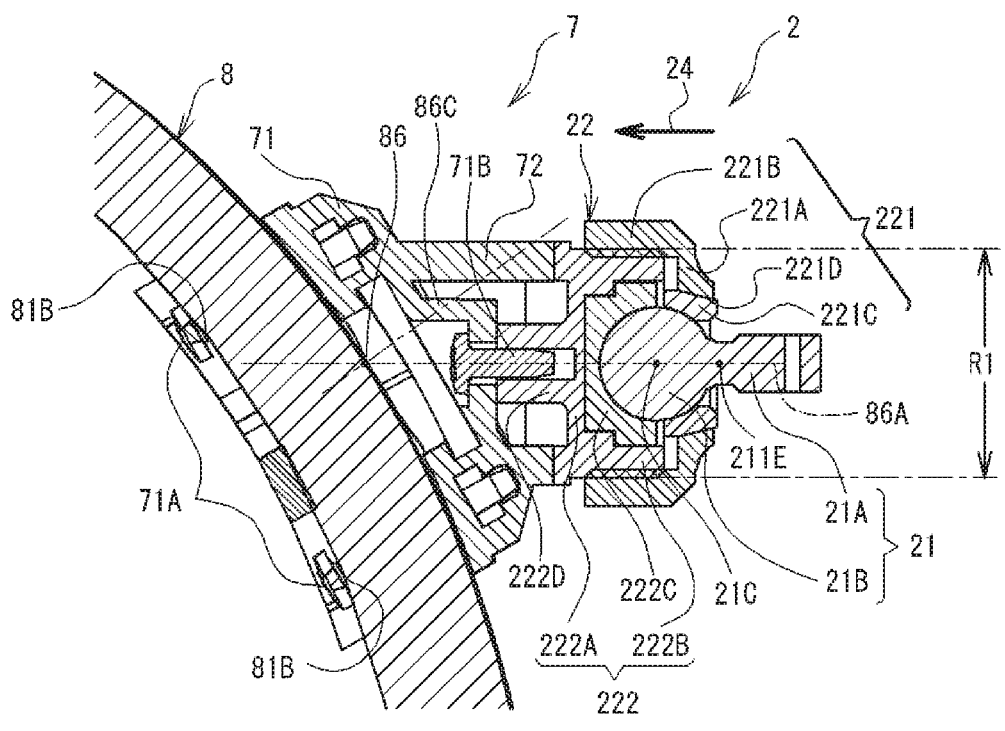
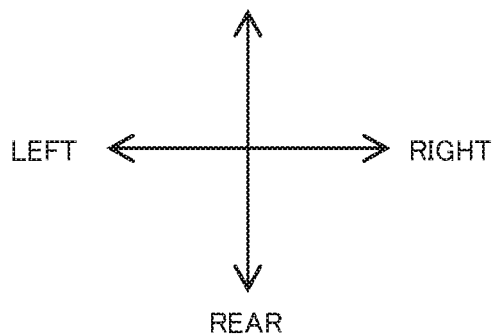

FIG. 9
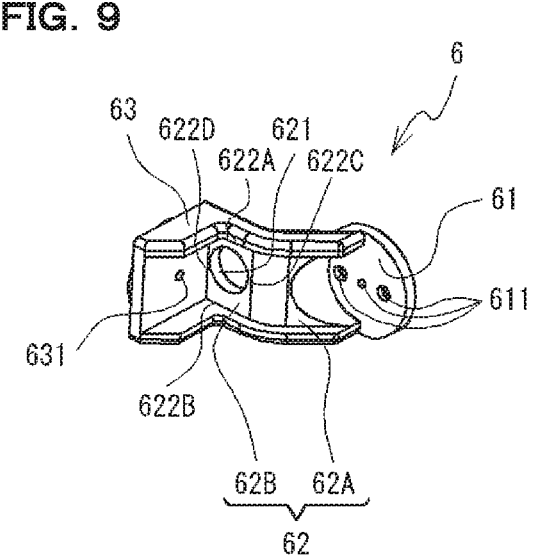
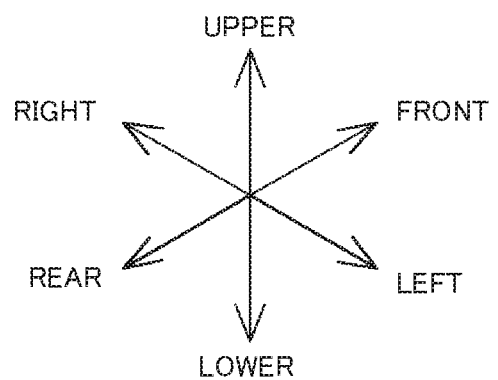

HEAD-MOUNTED DISPLAY

CROSS-REFERENCE TO RELATED APPLICATIONS

This application is a continuation application of PCT International Application No. PCT/JP2015/075560 which has an International filing date of Sep. 9, 2015 and designated the United States of America, and claiming priority on Patent Application No. 2014-187100 filed in Japan on Sep. 12, 2014.

TECHNICAL FIELD

The present disclosure relates to a head-mounted display.

BACKGROUND

A monocular type head-mounted display (hereinafter, referred to as "HMD"), which presents an image to one eye of a user, is known. A known HMD that is used in a state in which a display unit provided with a liquid crystal display (LCD) and a prism lens on an inner side is held in front of the one eye of the user. The display unit can rotate in a state in which a horizontal supporting axis extending in a horizontal direction is set as a supporting point. The LCD displays an image to form image light. The prism lens reflects the image light, which is formed by the LCD, toward a user side. The image light, which is reflected by the prism lens, is emitted from the display unit and is incident to the one eye of the user.

SUMMARY

The user may rotate the display unit in a state in which the horizontal supporting axis is set as the supporting point so as to adjust an incidence angle when the image light is incident to the eye of the user. In this case, it is preferable that the prism lens is disposed to be spaced away from the horizontal supporting axis on a side opposite to the user so that the image light is continuously incident to the eye even when the display unit rotates. The reason for the preference is as follows. In a case where the prism lens is disposed to be spaced away from the horizontal supporting axis, the prism lens moves in an upper and lower direction in accordance with the rotation of the display unit, and thus even when an emission direction of the image light varies, a variation in an arrival position of the image light becomes small.

However, in a known HMD, the prism lens is disposed to be adjacent to the horizontal supporting axis on the side opposite to the user. In this case, in a case where an emission direction of the image light varies in accordance with the rotation of the display unit, the arrival position of the image light varies, and thus the image light may deviate from the eye of the user. Therefore, it is necessary for the user to adjust the position of the display unit again to realize a state in which the image light is incident to the eye. As described above, in the known HMD, there is a problem that adjustment of the incidence angle of the image light is a troublesome work.

An object of the present disclosure is to provide a head-mounted display in which adjustment of an incidence angle of image light is easy.

According to a first aspect of the present disclosure, there is provided a head-mounted display including: a mounting fixture including a first section that extends in a first direction and is curved in a convex shape toward an one side in a second direction perpendicular to the first direction, and a pair of second sections which extend in a direction of approaching each other from both sides of the first section toward the other side in the second direction; an image display device including at least an image light unit that generates image light and is capable of emitting the image light to one side in the first direction along the first direction, a deflection member that deflects the image light emitted from the image light unit to the other side in the second direction, and a casing that covers the image light unit and the deflection member; a connection fixture that is a member that mounts the image display device to the mounting fixture, and extends in a third direction perpendicular to the first direction and the second direction; a first connection member that connects a portion, which is on the other side in the first direction in comparison to a center in the first direction and on the one side in the second direction in comparison to a center in the second direction, of an outer surface opposite to a surface on a side surrounded by the first section and the pair of second sections of mounting fixture, and the connection fixture to each other; and a second connection member that connects the image display device and the connection fixture, and at least rotatably supports the image display device with respect to the connection fixture in a state in which a specific rotation axis, which extends in the first direction and is disposed on the other side in the second direction in comparison to the image display device, is set as a supporting point.

According to a second aspect of the present disclosure, there is provided a head-mounted display including: an annular mounting fixture; an image display device including at least an image light unit that generates image light and is capable of emitting the image light to one side in a first direction along the first direction, a deflection member that deflects the image light emitted from the image light unit to one side in a second direction, and a casing that covers the image light unit and the deflection member; a connection fixture that is a member that mounts the image display device to the mounting fixture, and extends in a third direction perpendicular to the first direction and the second direction; a first connection member that connects a portion of the mounting fixture on the other side in the first direction in comparison to a center in the first direction and on the other side in the second direction in comparison to a center in the second direction, and the connection fixture to each other; and a second connection member that connects the image display device and the connection fixture to each other, and at least rotatably supports the image display device with respect to the connection fixture in a state in which a specific rotational axis, which extends in the first direction and is disposed on the one side in the second direction in comparison to the image display device, is set as a supporting point.

According to a third aspect of the present disclosure, there is provided a head-mounted display including: an image display device including at least an image light unit that generates image light and is capable of emitting the image light to one side in a first direction along the first direction, a deflection member that deflects the image light emitted from the image light unit to one side in a second direction perpendicular to the first direction, and a casing that covers the image light unit and the deflection member; a connection fixture that is a member that mounts the image display device to a mounting fixture to be mounted on the head of a user, and extends in a third direction perpendicular to the first direction and the second direction; a first connection member that connects the mounting fixture and the connection fixture to each other; and a second connection member that connects the image display device and the connection fixture to each other, and at least rotatably supports the image display device with respect to the connection fixture in a state in which a specific rotational axis, which extends in the first direction and is disposed on the one side in the second direction in comparison to the image display device, is set as a supporting point.

The above and further objects and features will more fully be apparent from the following detailed description with accompanying drawings.

BRIEF DESCRIPTION OF THE SEVERAL VIEWS OF THE DRAWINGS

FIG. 5 is a cross-sectional view taken along line V-V from an arrow direction in FIG. 2.
FIG. 9 is a perspective view of a connection member 6.

DETAILED DESCRIPTION

Figure 1:
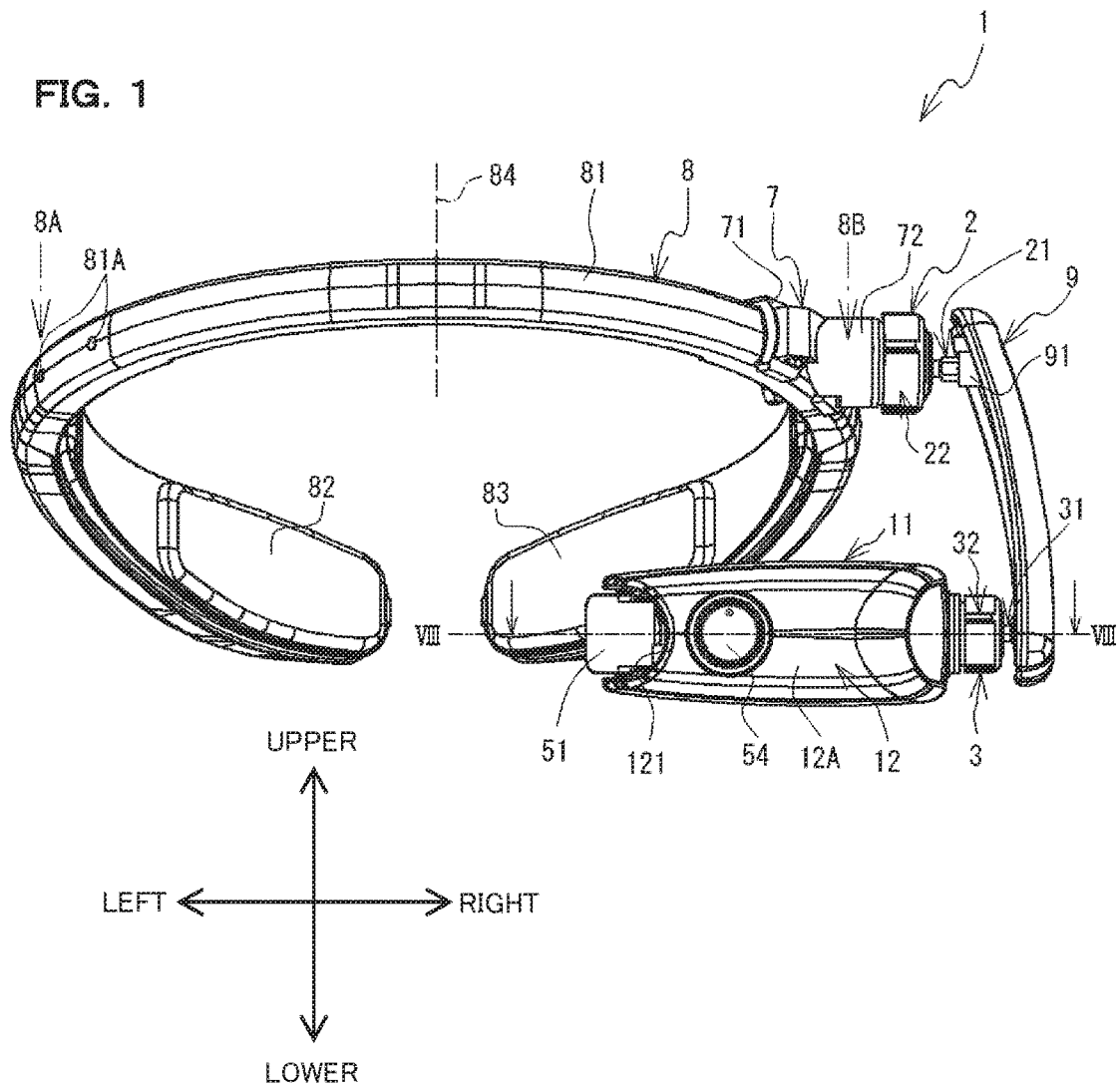
FIG. 1 is a front view of an HMD 1.

Hereinafter, description will be given of an embodiment of the present disclosure with reference to the accompanying drawings. As illustrated in FIG. 1, a head-mounted display (hereinafter, referred to as "HMD") 1 is an optical transmission type see-through HMD. Light of a landscape in front of eyes of a user is transmitted through a half mirror 51 and is directly guided to the eyes of the user. A projection type of the HMD 1 is a virtual image projection type. The half mirror 51 reflects light of an image, which is displayed on a liquid crystal panel 562 (to be described later, refer to FIG. 8), toward one eye of the user. The HMD 1 can allow the user to recognize an image in a state in which the image overlaps the landscape in front of the eye. The HMD 1 includes a mounting fixture 8, a connection fixture 9, and an image display device 11. Hereinafter, an upper side, a lower side, a left side, a right side, a front side, and a rear side of the image display device 11 will be defined for easy understanding of the drawings. For example, the upper side, the lower side, the left side, and the right side of the image display device 11 respectively correspond to an upper side, a lower side, a left side, and a right side in FIG. 1. For example, the front side and the rear side of the image display device 11 respectively correspond to an upper side and a lower side in FIG. 3. The upper side, the lower side, the left side, the right side, the front side, and the rear side of the image display device 11 respectively correspond to an upper side, a lower side, a right side, a left side, a front side, and a rear side of a user who wears the mounting fixture 8.

<Mounting Fixture 8>

Figure 2:
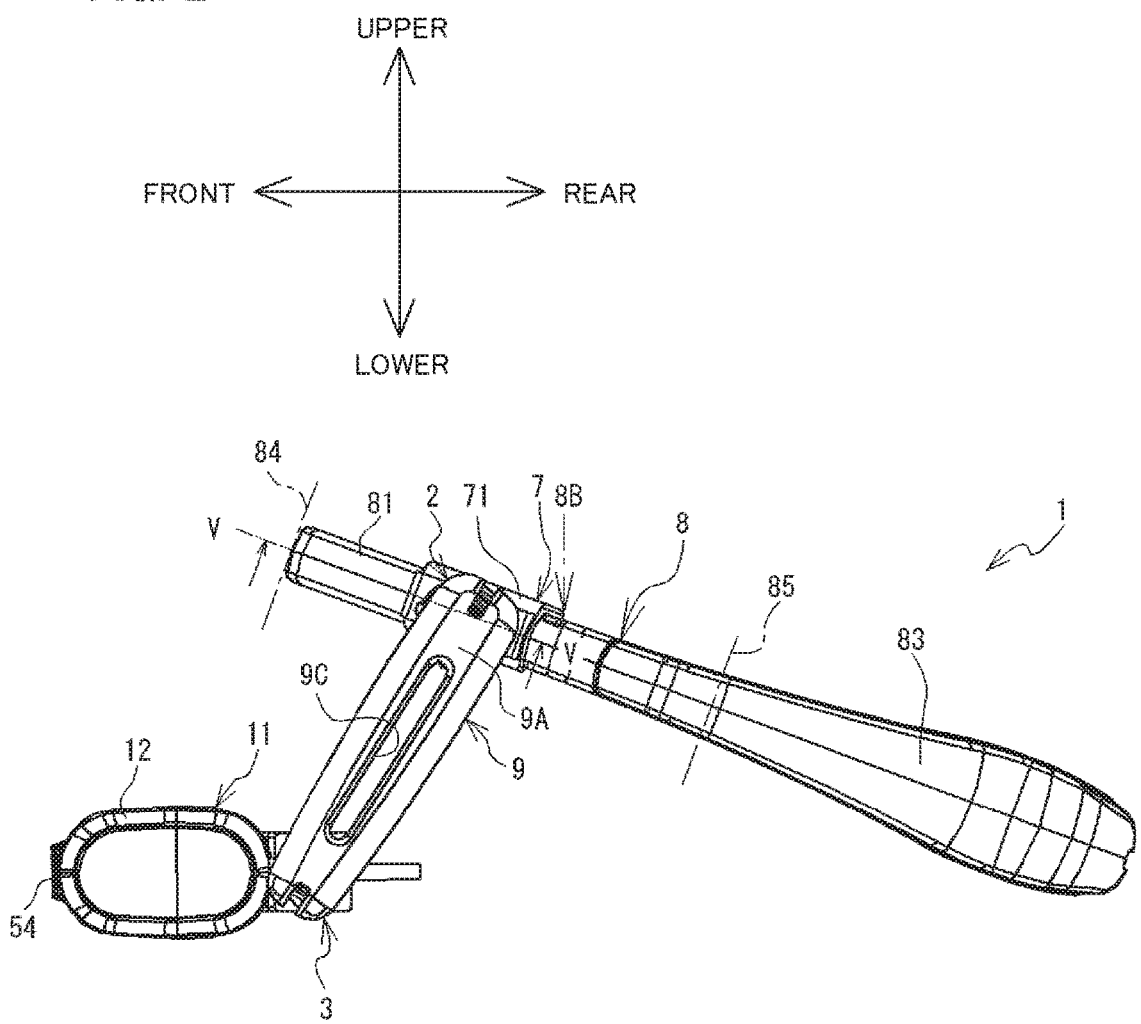
FIG. 2 is a right side view of the HMD 1.
Figure 3:
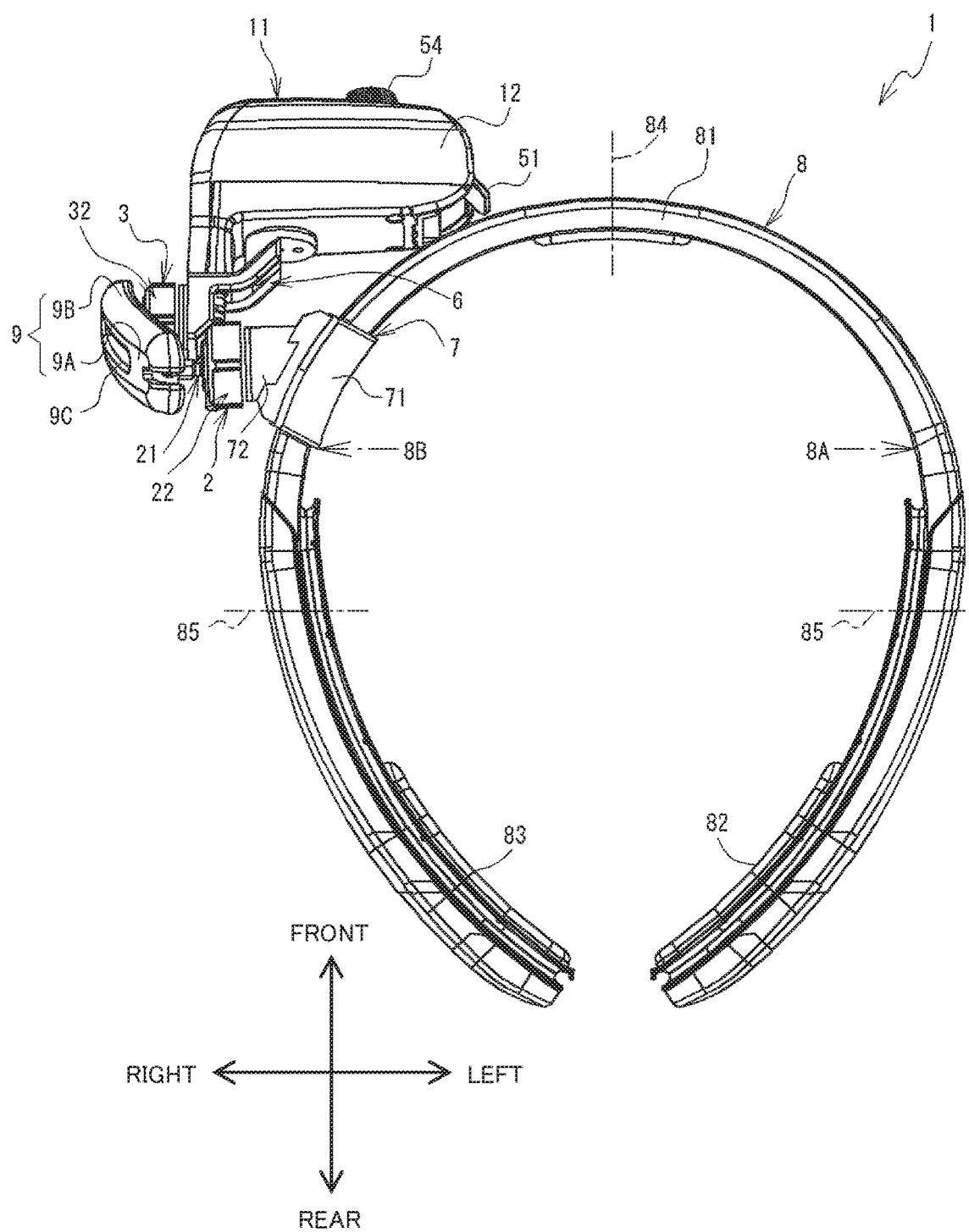
FIG. 3 is a plan view of the HMD 1.

As illustrated in FIG. 1, FIG. 2, and FIG. 3, the mounting fixture 8 is constituted by a flexible material such as a resin and a metal (for example, stainless steel). The mounting fixture 8 includes a first section 81 and second sections 82 and 83. In addition, in the following description, description will be made by dividing the mounting fixture 8 into the first section 81, and the second sections 82 and 83 for easy understanding, but the mounting fixture 8 is an integral member that is not divided into respective members of the first section, and the second sections 82 and 83.

The first section 81 and the second sections 82 and 83 are curved elongated plate-shaped members. In the mounting fixture 8, the first section 81 is a portion that extends between a position 8A and a position 8B in a right and left direction. The first section 81 is curved in a shape that is convex toward the front side. The position 8A is located on the left side in comparison to the center 84 of the mounting fixture 8 in the right and left direction, and on the front side in comparison to the center 85 (refer to FIG. 2) of the mounting fixture 8 in a front and rear direction. The position 8B is located on the right side in comparison to the center 84 of the mounting fixture 8 in the right and left direction, and on the front side of the center 85 (refer to FIG. 2) in the front and rear direction. In the mounting fixture 8, the second section 82 is a portion that extends from the position 8A to the rear side. In the mounting fixture 8, the second section 83 is a portion that extends from the position 8B to the rear side. The second sections 82 and 83 extend in directions in which rear ends thereof approach each other. The mounting fixture 8 is worn on the head of a user in a state in which the first section 81, and the second sections 82 and 83 are respectively brought into contact with the frontal region, the right temporal region, and the left temporal region of the user. In this state, the first section 81 extends along the forehead of the user in the right and left direction. Hereinafter, in the mounting fixture 8, a side, which is surrounded by the first section 81, and the second sections 82 and 83 is referred to as "inner side of the mounting fixture 8", and a side opposite to the inner side of the mounting fixture 8 is referred to as "outer side of the mounting fixture 8".

As illustrated in FIG. 1, the first section 81 includes two holes 81A, which pass therethrough between the outer side and the inner side, on the front side of the position 8A. The first section 81 includes two holes 81B (refer to FIG. 5), which pass therethrough between the outer side and the inner side, on the front side of the position 8B. A connection member 7 to be described later is connected to a position at which the two holes 81B are covered. Furthermore, the connection member 7 may be connected to a position at which the two holes 81A are covered.

<Connection Fixture 9>

Figure 4:
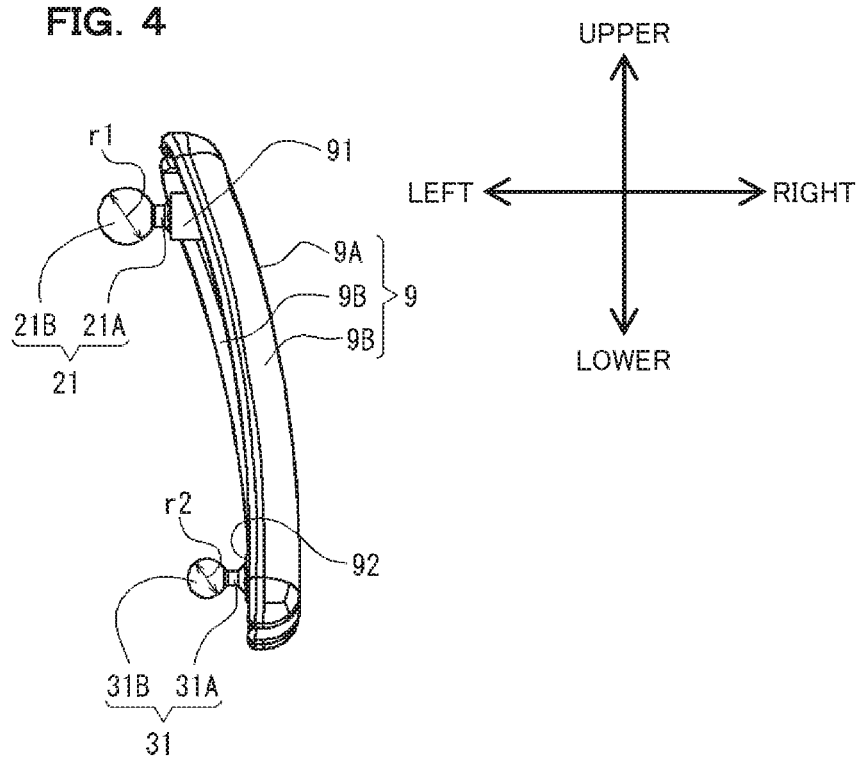
FIG. 4 is a front view of a connection fixture 9.

As illustrated in FIG. 4, the connection fixture 9 has an approximately rod shape. The connection fixture 9 is constituted by a resin, a metal, and the like. The connection fixture 9 extends in the upper and lower direction in a state of being seen from the front side. More specifically, as illustrated in FIG. 2, the connection fixture 9 extends in a direction in which a lower end is inclined to the front side with respect to the upper and lower direction. As illustrated in FIG. 3 and FIG. 4, the connection fixture 9 includes a first wall section 9A and a second wall section 9B which have a plate shape. In the first wall section 9A, a pair of flat surfaces having the greatest area faces the right and left direction. As illustrated in FIG. 2, the first wall section 9A includes a hole 9C that passes therethrough in the right and left direction. The hole 9C is a slid that is long in the upper and lower direction. As illustrated in FIG. 3, the second wall section 9B extend from a front end, a rear end, an upper end, and a lower end of the first wall section 9A while being curved to a left direction.

An upper end of the connection fixture 9 is connected to the mounting fixture 8 through a first ball joint 2 and the connection member 7 to be described later. A lower end of the connection fixture 9 is connected to the image display device 11 through a second ball joint 3 and a connection member 6 to be described later. The image display device 11 is mounted to the mounting fixture 8 by the connection fixture 9. The connection fixture 9 holds the image display device 11 at a position spaced away from the mounting fixture 8. The connection fixture 9 can dispose the half mirror 51 of the image display device 11 in front of a left eye of a user in a state in which the mounting fixture 8 is worn on the head of the user.

<Connection Member 7>

As illustrated in FIG. 1 and FIG. 3, the connection member 7 includes a connection section 71 and a circular column section 72. The connection section 71 comes into contact with an inner side, an outer side, and an upper side of the mounting fixture 8 (refer to FIG. 5). The connection section 71 detachably connects the connection member 7 to the mounting fixture 8. As illustrated in FIG. 5, the connection section 71 is fixed to the mounting fixture 8 by two screws 71A which are inserted into the two holes 81B from the inner side. As illustrated in FIG. 1 and FIG. 3, the circular column section 72 is a circular column-shaped member. The circular column section 72 protrudes from a portion, which comes into contact with the outer side of the mounting fixture 8, of the connection section 71 to the right side. As illustrated in FIG. 3, the central axis of the circular column section 72 extends in parallel to the right and left direction. A diameter of the circular column section 72 is approximately the same as a width of a portion, in which the two holes 81B are formed, of the mounting fixture 8 in the upper and lower direction. A first socket 22 of the first ball joint 2, which will be described later, is connected to a right end of the circular column section 72.

<First Ball Joint 2>

As illustrated in FIG. 5, the first ball joint 2 includes a first ball stud 21 and the first socket 22. The first ball stud 21 includes a first rod section 21A and a first sphere section 21B. The first rod section 21A is a rod-shaped portion. The first rod section 21A linearly extends in the right and left direction. As illustrated in FIG. 4, a cylindrical fitting section 91 is provided on a left lateral surface on an upper end of the first wall section 9A of the connection fixture 9. A right end of the first rod section 21A is fitted to an inner side of the fitting section 91. An axis, which passes through the cylinder center of the fitting section 91 is perpendicular to the first wall section 9A. The fitting section 91 extends from the first wall section 9A in the left direction. The first rod section 21A is fixed to the connection fixture 9 in a state of extending from the first wall section 9A of the connection fixture 9 in the left direction. The first rod section 21A is approximately perpendicular to the first wall section 9A. The first sphere section 21B is a spherical portion that is provided on a left end of the first rod section 21A. Hereinafter, a diameter of the first sphere section 21B is described as "r1". r1 is greater than a diameter of a cross-section that is perpendicular to the right and left direction of the first rod section 21A.

As illustrated in FIG. 5, the first socket 22 includes a first lid section 221 and a first accommodation section 222. The first accommodation section 222 includes a bottom section 222A, a side section 222B, and a first contact section 222C.

The bottom section 222A is a circular plate-shaped portion that comes into contact with a right end of the circular column section 72 of the connection member 7. In the bottom section 222A, a pair of flat surfaces having the greatest area faces the right and left direction. A diameter of the bottom section 222A is approximately the same as a diameter of the circular column section 72. A protrusion 222D, which protrudes in the left direction, is provided on a left lateral surface of the bottom section 222A. A screw hole, which extends in the right direction, is provided in the left lateral surface of the protrusion 222D. The bottom section 222A is fixed to the circular column section 72 by a screw 71B that is screwed to the screw hole.

The side section 222B is a tubular portion that extends in the right direction from an end of the bottom section 222A in a direction perpendicular to the right and left direction. A screw thread is formed in an outer surface of the side section 222B. The first contact section 222C is disposed in a portion that is surrounded by the side section 222B. The first contact section 222C is an elastically deformable rubber that functions as a buffer material. The first contact section 222C comes into contact with a left-side portion of the first sphere section 21B of the first ball stud 21.

The first lid section 221 includes a bottom section 221A, a side section 221B, and a first contact section 221C. The bottom section 221A is a circular plate-shaped portion. In the bottom section 221A, a pair of flat surfaces having the greatest area faces the right and left direction. A diameter of the bottom section 221A is slightly greater than an outer diameter of the side section 222B of the first accommodation section 222. The bottom section 221A includes a circular first hole 221D, which passes therethrough in the right and left direction, at the center. A diameter of the first hole 221D is greater than a diameter of a cross-section that is perpendicular to the right and left direction of the first rod section 21A, and is smaller than r1 that is the diameter of the first sphere section 21B of the first ball stud 21. The first rod section 21A of the first ball stud 21 passes through the first hole 221D in the right and left direction. The first sphere section 21B is disposed on the left side of the first hole 221D. Hereinafter, in the first ball joint 2, a state in which the first rod section 21A of the first ball stud 21 passes through the center of the periphery of the first hole 221D is referred to as "first neutral state".

The first contact section 221C is disposed in a gap between the first rod section 21A and the first sphere section 21B, and the first hole 221D. The first contact section 221C is an elastically deformable rubber that functions as a buffer material. The first contact section 221C comes into contact with a right-side portion of the first sphere section 21B.

The side section 221B is a tubular portion that extends from an end of the bottom section 221A in a direction perpendicular to the right and left direction in the left direction. A screw thread is formed in an inner surface of the side section 221B. The screw thread of the side section 221B is fitted to the screw thread of the side section 222B of the first accommodation section 222. According to this, the first lid section 221 is screwed to the first accommodation section 222. Hereinafter, an inner diameter of the side section 221B is referred to as a first diameter and is described as "R1". During screwing of the first lid section 221 to the first accommodation section 222, the first lid section 221 moves from the connection fixture 9 side toward the mounting fixture 8 side in a direction indicated by an arrow 24. The first sphere section 21B is disposed in a space that is surrounded by the first lid section 221 and the first accommodation section 222. The first sphere section 21B is interposed between the first contact sections 221C and 222C from both sides in the right and left direction.

The first sphere section 21B can rotate in an arbitrary direction through sliding with respect to the first contact sections 221C and 222C. Accordingly, the first ball joint 2 can rotate the connection fixture 9 in an arbitrary direction with respect to the mounting fixture 8. Furthermore, a direction in which the first rod section 21A extends from the first sphere section 21B varies in accordance with the rotation of the first sphere section 21B except for a case where the first sphere section 21B rotates in a state in which the first rod section 21A is set as a supporting point. A variable range of the direction in which the first rod section 21A extends is restricted when the first rod section 21A comes into contact with the first contact section 221C. According to this, a rotatable range when the first sphere section 21B rotates is regulated.

Hereinafter, a rotational axis 86A, which extends along the first rod section 21A when the first ball joint 2 is in the first neutral state, will be defined. The rotational axis 86A corresponds to a line segment that extends along a direction in which the center 21C of the first sphere section 21B and the center 211E of the periphery of the first hole 221D are connected to each other. An intersection between an outer surface of the mounting fixture 8 and the rotational axis 86A in the first neutral state is defined as a connection portion 86. A normal line 86C at the connection portion 86 of the mounting fixture 8 will be defined. In this case, the rotational axis 86A in the first neutral state intersects the front and rear direction, the upper and lower direction, and the normal line 86C.

A force of pressing the first contact sections 221C and 222C to the first sphere section 21B varies in accordance with the degree of screwing of the first lid section 221 to the first accommodation section 222, in other words, a distance between the bottom section 222A of the first accommodation section 222 and the bottom section 221A of the first lid section 221. As the bottom section 221A approaches the bottom section 222A, the force of pressing the first contact sections 221C and 222C to the first sphere section 21B also increases. In this case, static torque between the first sphere section 21B and the first contact sections 221C and 222C increases. Furthermore, static torque between the first sphere section 21B and the first contact sections 221C and 222C corresponds to torque cable of holding the connection fixture 9 by the first ball joint 2 in a case of changing a direction in which the connection fixture 9 extends with respect to the mounting fixture 8. Accordingly, a user can adjust the static torque between the first sphere section 21B and the first contact sections 221C and 222C by adjusting the degree of screwing of the first lid section 221 with respect to the first accommodation section 222. Hereinafter, the static torque between the first sphere section 21B and the first contact sections 221C and 222C is described as F1 (unit: N·m).

<Image Display Device 11>

Figure 6:
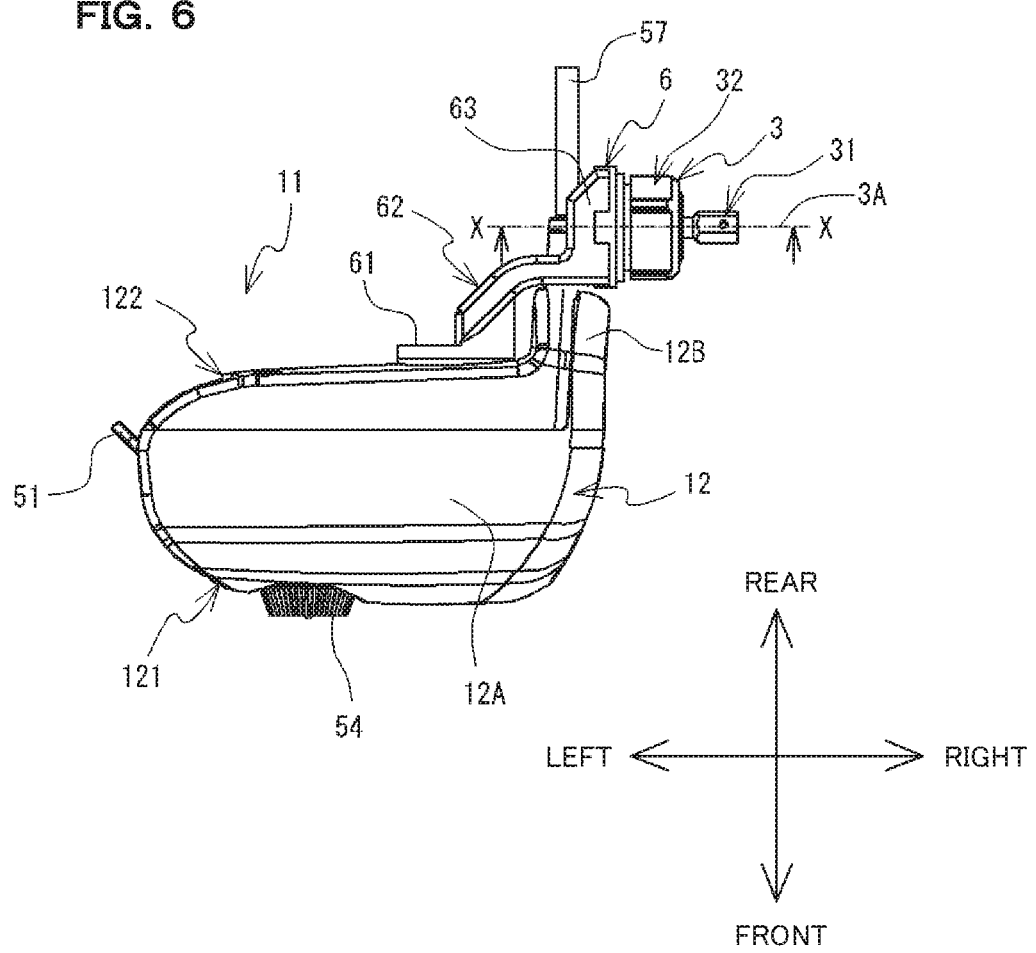
FIG. 6 is a plan view of an image display device 11.
Figure 7:
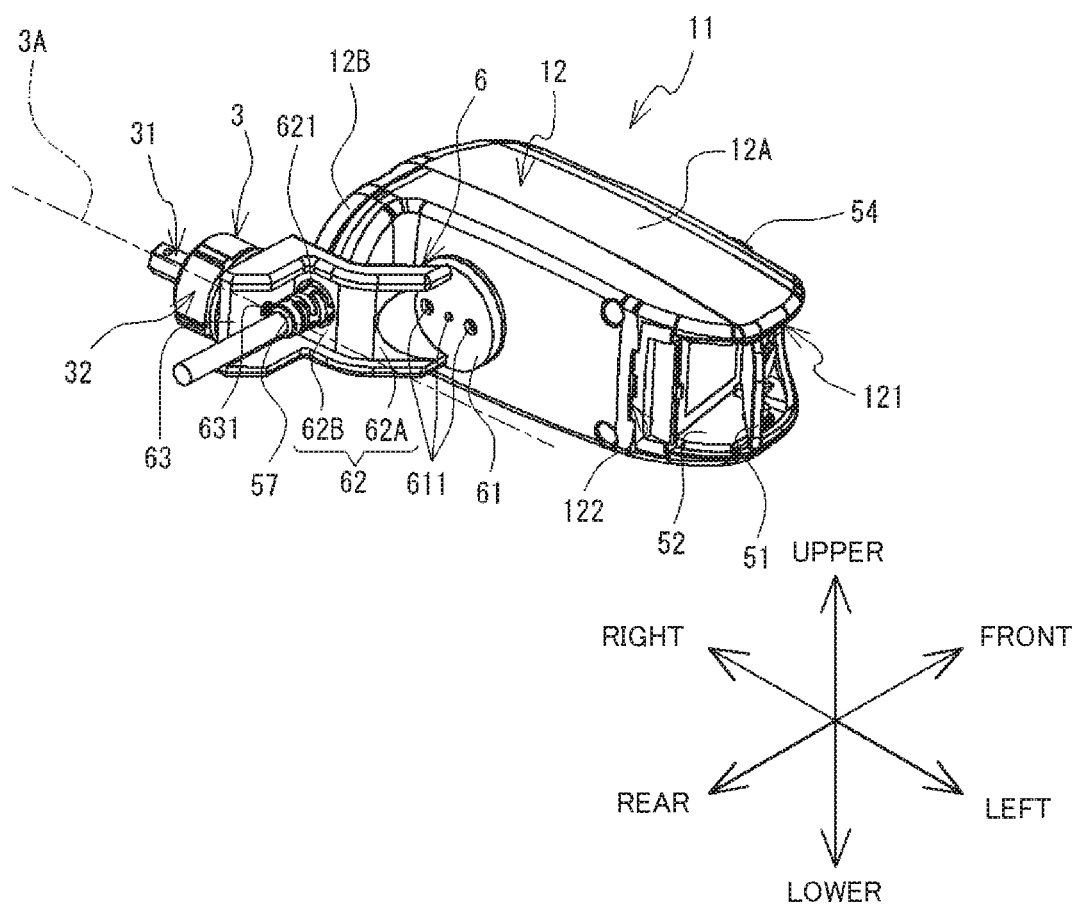
FIG. 7 is a perspective view of the image display device 11.
Figure 8:
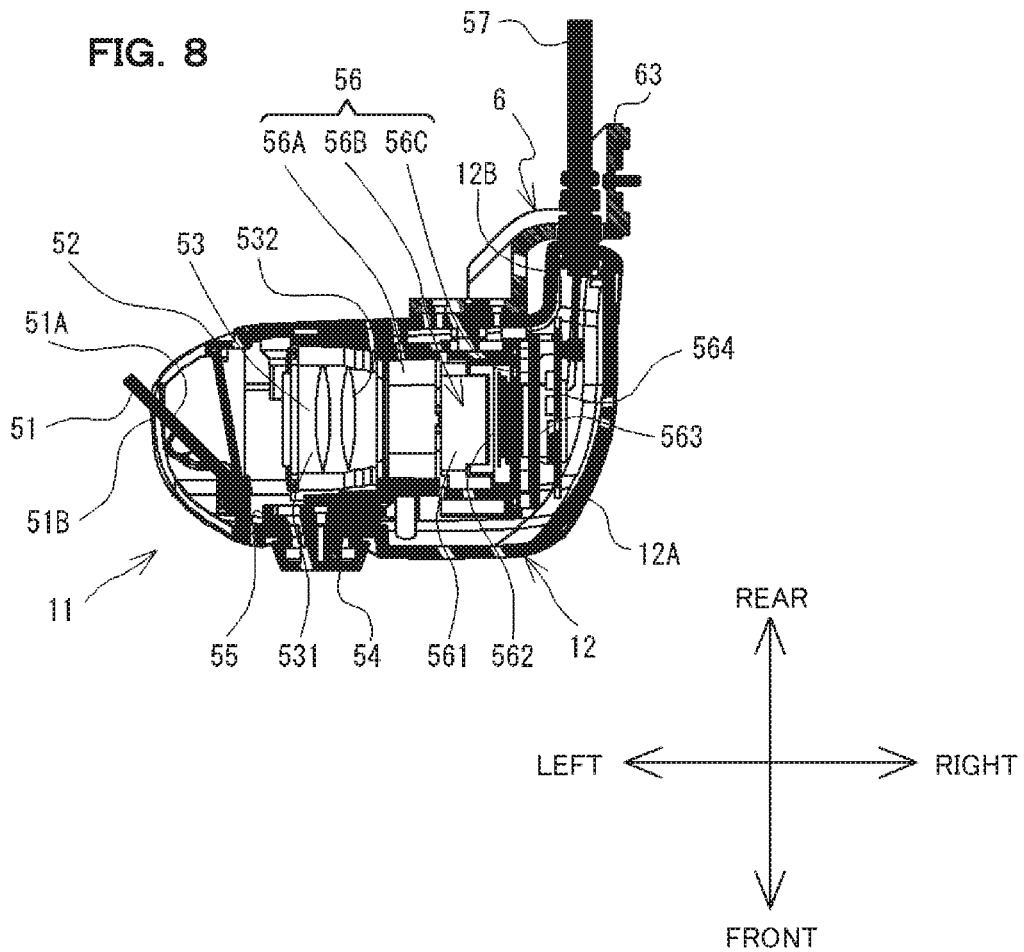
FIG. 8 is a cross-sectional view taken along line VIII-VIII from an arrow direction in FIG. 1.

As illustrated in FIG. 6, FIG. 7, and FIG. 8, the image display device 11 includes a casing 12. The casing 12 includes a main body section 12A and a protrusion 12B. The main body section 12A has an approximately rectangular parallelepiped shape with curved corners. The protrusion 12B protrudes from right-rear side of the main body section 12A to a backward side. The casing 12 has a hollow box shape. A left side of the main body section 12A is opened, and a left side of a lens unit 53 (refer to FIG. 8) inside the casing 12 is exposed. As illustrated in FIG. 1, a left end 121 is provided at a left end portion on a front surface of the main body section 12A. The left end 121 is recessed to the left side from both ends in the upper and lower direction toward the center in the upper and lower direction. The left end 121 forms an approximately circular arc. As illustrated in FIG. 7, a left end 122 is provided at a left end portion on a rear surface of the main body section 12A. The left end 122 is recessed to the right side. As illustrated in FIG. 6 and FIG. 7, the connection member 6 is connected to the rear surface of the main body section 12A on the right side in comparison to the center in the right and left direction. Details of the connection member 6 will be described later. A communication line 57, which extends from a rear end of the protrusion 12B toward the rear side, includes a signal line, a power line, and a clad. The signal line is a conductive line capable of transmitting control data. The power line is a conductive line capable of transmitting power. The clad covers the periphery of the signal line and the power line for insulation and protection of the signal line and the power line. The communication line 57 is inserted into the protrusion 12B. The HMD 1 is connected to an external device (not illustrated) through the communication line 57. The external device outputs image data to the HMD 1 through the signal line of the communication line 57.

As illustrated in FIG. 8, a lens unit 53, an adjustment mechanism 55, and an image light unit 56 are disposed in the casing 12. A holder 52 is held to the left end of the main body section 12A of the casing 12. The holder 52 supports the half mirror 51. The half mirror 51, the holder 52, the lens unit 53, and the image light unit 56 are arranged sequentially from the left side to the right side. The adjustment mechanism 55 is disposed in front of the lens unit 53. As illustrated in FIG. 1, an operation member 54 is provided on the front surface of the main body section 12A on the left side in comparison to the center in the right and left direction. The operation member 54 is disposed in front of the adjustment mechanism 55 with the front surface of the main body section 12A interposed therebetween.

The image light unit 56 receives the image data from the external device through the signal line of the communication line 57. The image light unit 56 generates image light of an image in accordance with the image data that is received, and emits the image light. The image light unit 56 includes a first holding member 56A, a liquid crystal display device 56B, and a second holding member 56C. The first holding member 56A is a cylindrical member that extends in the right and left direction. The first holding member 56A is held at a stationary position with respect to the casing 12. The liquid crystal display device 56B includes a glass substrate 561 and a liquid crystal panel 562. The glass substrate 561 and the liquid crystal panel 562 are provided on the right side of the first holding member 56A. The liquid crystal panel 562 is a known rectangular liquid crystal panel. The liquid crystal panel 562 displays an image on a left lateral surface and generates image light. The glass substrate 561 is provided on the left lateral surface of the liquid crystal panel 562 to protect a display surface of the liquid crystal panel 562. For example, in a case where the liquid crystal panel 562 is a reflection type liquid crystal, light from a light source (not illustrated), which is guided by the glass substrate 561, is incident to the liquid crystal panel 562. The liquid crystal panel 562 reflects the incident light to generate image light. The image light, which is generated by the liquid crystal panel 562, is transmitted through a left side of the glass substrate 561. The second holding member 56C includes a substrate holding section 563 and a control substrate 564. The substrate holding section 563 is disposed on the right side of the liquid crystal panel 562 of the liquid crystal display device 56B. The control substrate 564 is held on the right of the substrate holding section 563. The control substrate 564 is connected to the liquid crystal panel 562 through a flexible printed substrate (not illustrated). The signal line of the communication line 57 is connected to the control substrate 564. The control substrate 564 receives image data, which is transmitted from the external device, through the signal line of the communication line 57. The control substrate 564 outputs a control signal to the liquid crystal panel 562 through the flexible printed substrate to display an image in accordance with the image data on the liquid crystal panel 562.

Furthermore, in the present disclosure, a two-dimensional display device such as a digital mirror device (DMD) and an organic electro luminescence (EL) may be used instead of the liquid crystal panel 562. In addition, a retinal scanning display, which projects two-dimensionally scanned light on a retina of a user, may be used.

The lens unit 53 is disposed on the left side of the image light unit 56. The lens unit 53 guides image light, which is emitted from the image light unit 56, to the half mirror 51 that is disposed on the left side of the lens unit 53. The lens unit 53 includes a holding member 531 having an approximately square tube shape. The holding member 531 is held to an inner wall of the casing 12 in a slidable manner in the right and left direction. A plurality of lenses 532 are fixed on an inner side of the holding member 531. An optical axis of each of the plurality of lenses 532 is disposed on an axial line obtained by extending the center of the holding member 531 in the right and left direction. Image light, which is generated by the image light unit 56, is incident to the inside of the holding member 531 from the right side, and is emitted from a left end of the holding member 531 toward the left side. The plurality of lenses 532 refracts the image light, which is incident from the right side, and emits the image light to the left side. A convex portion (not illustrated), which protrudes to a forward side, is provided on a front-side surface of the holding member 531. The convex portion is fitted into a cam groove (not illustrated) of the adjustment mechanism 55 to be described later. The lens unit 53 is movable in the right and left direction.

The operation member 54 is a truncated cone-shaped member. The central axis of the operation member 54 extends in the front and rear direction. The operation member 54 can rotate around the central axis as the center. The adjustment mechanism 55 is a circular plate-shaped member. In the adjustment mechanism 55, a pair of flat surfaces having the greatest size faces the front and rear direction. The adjustment mechanism 55 is connected to the operation member 54 that is disposed on a forward side. The cam groove (not illustrated) is provided in a rear lateral surface of the adjustment mechanism 55. The convex portion (not illustrated) of the holding member 531 of the lens unit 53 is fitted into the cam groove from a backward side. The adjustment mechanism 55 can rotate around an axis, which passes through the circular center and extends in the front and rear direction, integrally with the operation member 54. In a case where the operation member 54 rotates, the cam groove of the adjustment mechanism 55 moves the convex portion of the holding member 531 of the lens unit in the right and left direction. The lens unit 53 moves in the right and left direction in accordance with the rotation of the operation member 54. A user can perform focus adjustment of the HMD 1 by rotating the operation member 54.

The holder 52 is disposed on the left side of the lens unit 53. The holder 52 is detachable from the casing 12. The holder 52 supports the half mirror 51. The half mirror 51 is disposed on the left side of the lens unit 53. The half mirror 51 has a rectangular plate shape. One surface 51A of both surfaces of the half mirror 51 faces a diagonally right backward side. The other surface 51B of the both surfaces of the half mirror 51 faces a diagonally left forward side. The half mirror 51 can reflect a part of light (for example, 50%) incident from a surface 51A side and a surface 51B side, and can allow the other part to be transmitted therethrough. The half mirror 51 can reflect image light, which is transmitted through the lens unit 53 and is incident from the right side, to the rear side. A user can confirm a virtual image with eyes on the basis of the image light that is reflected to the rear side by the half mirror 51. In addition, the half mirror 51 can allow external light, which is incident from the surface 51B side, to be transmitted therethrough to the rear side. For example, the half mirror 51 is configured by depositing a metal such as aluminum and silver on a transparent resin or a glass substrate to have a predetermined reflectivity (for example, 50%).

Furthermore, in the present disclosure, a reflective member, which does not reflect the image light incident from the surface 51A side to the left side, may be used instead of the half mirror 51. In this case, the light incident from the surface 51B side is not transmitted through the reflective member. In addition, an optical path deflection member such as a prism and a diffraction lattice may be used instead of the half mirror 51.

<Connection Member 6>

As illustrated in FIG. 6 and FIG. 7, the connection member 6 connects the image display device 11 and the second ball joint 3 to be described later to each other. In FIG. 8, the second ball joint 3 is not illustrated. As illustrated in FIG. 6, FIG. 7, and FIG. 9, the connection member 6 includes supporting sections 61, 62, and 63. The supporting section 61 has a circular plate shape. In the supporting section 61, a pair of flat surfaces having the greatest area faces the front and rear direction. A diameter of the supporting section 61 is shorter than a length of a rear surface of the casing 12 of the image display device 11 in the upper and lower direction (refer to FIG. 7). The supporting section 61 includes a plurality of holes 611 which are arranged in the right and left direction (refer to FIG. 7 and FIG. 9). The connection member 6 is fixed to the rear surface of the casing 12 by a screw (not illustrated) that is inserted into the plurality of holes 611 from the rear side.

As illustrated in FIG. 7 and FIG. 9, the supporting section 62 includes a first supporting section 62A and a second supporting section 62B. The first supporting section 62A extends from a right end of the supporting section 61 to a backward side. As illustrated in FIG. 7, a length of the first supporting section 62A in the front and rear direction is slightly longer than a length of the protrusion 12B of the casing 12 of the image display device 11 in the front and rear direction. The second supporting section 62B extends from a rear end of the first supporting section 62A to the right side. The second supporting section 62B passes through a backward side of the protrusion 12B. The second supporting section 62B includes a hole 621 that passes therethrough in the front and rear direction. The communication line 57 is inserted into the rear end of the protrusion 12B. The communication line 57 passes through the hole 621 in the front and rear direction. A diameter of the hole 621 is slightly greater than a diameter a portion, which is connected to the protrusion 12B, of the communication line 57. The second supporting section 62B of the supporting section 62 at least includes a first connection portion 622A that is disposed on the upper side in comparison to an upper end of the communication line 57, and a second connection portion 622B that is disposed on the lower side in comparison to a lower end of the communication line 57. In this embodiment, the second supporting section 62B further includes a third connection portion 622C that is disposed on the left side in comparison to a left end of the communication line 57, and a fourth connection portion 622D that is disposed on the right side in comparison to a right end of the communication line 57.

The supporting section 63 extends from a right end of the supporting section 62 to a backward side. As illustrated in FIG. 8, a position of a right lateral surface of the supporting section 63 in the right and left direction is approximately the same as a position of a right surface of the casing 12 of the image display device 11 in the right and left direction. As illustrated in FIG. 9, the supporting section 63 includes a hole 631 that passes therethrough in the right and left direction. As illustrated in FIG. 6 and FIG. 7, a second socket 32 of the second ball joint 3 is connected to a right lateral surface of the supporting section 63. The second socket 32 is fixed to the connection member 6 by a screw 69 (refer to FIG. 10) that is inserted into the hole 631 from the left side.

<Second Ball Joint 3>

Figure 10:
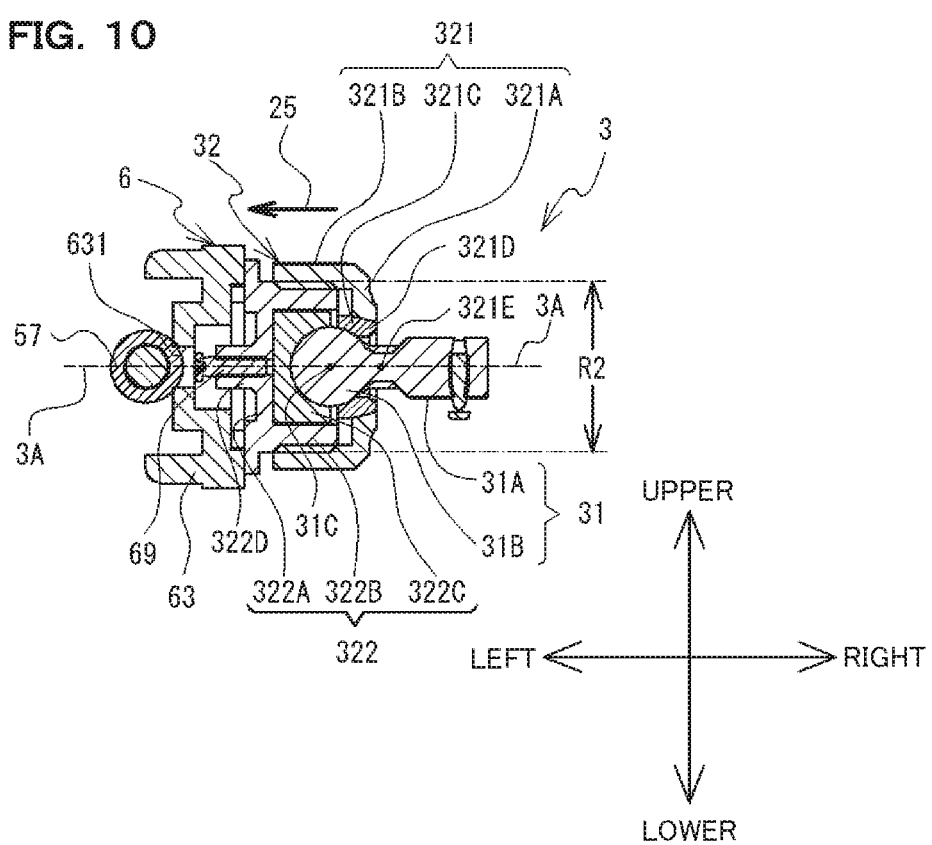
FIG. 10 is a cross-sectional view taken along line X-X from an arrow direction in FIG. 6.

As illustrated in FIG. 10, the second ball joint 3 includes a second ball stud 31 and the second socket 32. The second ball stud 31 includes a second rod section 31A and a second sphere section 31B. The second rod section 31A is a rod-shaped portion. The second rod section 31A linearly extends in the right and left direction. As illustrated in FIG. 4, a cylindrical fitting section 92 is provided on a left lateral surface of a lower end of the first wall section 9A of the connection fixture 9. A right end of the second rod section 31A is fitted to an inner side of the fitting section 92. An axis, which passes through the cylinder center of the fitting section 92, is perpendicular to the first wall section 9A. The fitting section 92 extends from the first wall section 9A in the left direction. The second rod section 31A is fixed to the connection fixture 9 in a state of extending from the first wall section 9A of the connection fixture 9 in the left direction. The second rod section 31A is approximately perpendicular to the first wall section 9A. The second sphere section 31B is a spherical portion that is provided in a left end of the second rod section 31A. Hereinafter, a diameter of the second sphere section 31B is described as "r2". r2 is greater than a diameter of a cross-section of the second rod section 31A which is perpendicular to the right and left direction. In addition, r2 is smaller than r1 that is the diameter of the first sphere section 21B.

As illustrated in FIG. 10, the second socket 32 includes a second lid section 321 and a second accommodation section 322. The second accommodation section 322 includes a bottom section 322A, a side section 322B, and a second contact section 322C. The bottom section 322A is a circular plate-shaped portion that comes into contact with the right lateral surface of the supporting section 63 of the connection member 6. In the bottom section 322A, a pair of flat surfaces having the greatest area faces the right and left direction. A protrusion 322D, which protrudes in the left direction, is provided on a left lateral surface of the bottom section 322A. A screw hole, which extends in the right direction, is provided in a left lateral surface of the protrusion 322D. The bottom section 322A is fixed to the connection member 6 by the screw 69 that is inserted into the screw hole.

The side section 322B is a tubular portion that extends from an end of the bottom section 322A in a direction perpendicular to the right and left direction toward the right side. A screw thread is formed in an outer surface of the side section 322B. The second contact section 322C is disposed in a portion that is surrounded by the side section 322B. The second contact section 322C is an elastically deformable rubber that functions as a buffer material. The second contact section 322C comes into contact with a left-side portion of the second sphere section 31B of the second ball stud 31.

The second lid section 321 includes a bottom section 321A, a side section 321B, and a second contact section 321C. The bottom section 321A is a circular plate-shaped portion. In the bottom section 321A, a pair of flat surfaces having the greatest area faces the right and left direction. A diameter of the bottom section 321A is slightly greater than an outer diameter of the side section 322B of the second accommodation section 322. The bottom section 321A includes a circular second hole 321D that passes through the center of the bottom section 321A in the right and left direction. A diameter of the second hole 321D is greater than a diameter of a cross-section of the second rod section 31A which is perpendicular to the right and left direction, and is smaller than r2 that is the diameter of the second sphere section 31B of the second ball stud 31. The second rod section 31A of the second ball stud 31 passes through the second hole 321D in the right and left direction. The second sphere section 31B is disposed on the left side of the second hole 321D. Hereinafter, in the second ball joint 3, a state in which the second rod section 31A of the second ball stud 31 passes through the center of the periphery of the second hole 321D is referred to as "second neutral state".

The second contact section 321C is disposed in a gap between the second rod section 31A and the second sphere section 31B, and the second hole 321D. The second contact section 321C is an elastically deformable rubber that functions a buffer material. The second contact section 321C comes into contact with a right-side portion of the second sphere section 31B.

The side section 321B is a tubular portion that extends from an end of the bottom section 321A in a direction that is perpendicular to the right and left direction toward the left direction. A screw thread is formed in an inner surface of the side section 321B. The screw thread of the side section 321B is fitted to the screw thread of the side section 322B of the second accommodation section 322. According to this, the second lid section 321 is screwed to the second accommodation section 322. Hereinafter, an inner diameter of the side section 321B is referred to as a second diameter, and is described as "R2". R2 is smaller than R1 (refer to FIG. 5) that is the first diameter of the side section 222B of the first accommodation section 222.

During screwing of the second lid section 321 to the second accommodation section 322, the second lid section 321 moves from the connection fixture 9 side toward the image display device 11 side in a direction indicated an arrow 25. The second sphere section 31B is disposed in a space that is surrounded by the second lid section 321 and the second accommodation section 322. The second sphere section 31B is interposed between the second contact sections 321C and 322C from both sides in the right and left direction.

The second sphere section 31B can rotate in an arbitrary direction through sliding with respect to the second contact sections 321C and 322C. Accordingly, the second ball joint 3 can rotate the connection member 6 and the image display device 11 in an arbitrary direction with respect to the connection fixture 9. Furthermore, a direction in which the second rod section 31A extends from the second sphere section 31B varies in accordance with the rotation of the second sphere section 31B except for a case where the second sphere section 31B rotates in a state in which the second rod section 31A is set as a supporting point. A variable range of the direction in which the second rod section 31A extends is restricted when the second rod section 31A comes into contact with the second contact section 321C. According to this, a rotatable range when the second sphere section 31B rotates is regulated.

Hereinafter, a rotational axis 3A, which extends along the second rod section 31A when the first ball joint 2 is in the first neutral state and the second ball joint 3 is in the second neutral state, will be defined. In a case where the first ball joint 2 is in the first neutral state, the rotational axis 3A corresponds to a line segment that extends along a direction in which the center 31C of the second sphere section 31B and the center 321E of the periphery of the second hole 321D are connected to each other. Furthermore, the rotational axis 3A extends in parallel to the right and left direction. In other words, the rotational axis 3A intersects both the front and rear direction and the upper and lower direction.

As illustrated in FIG. 7, the first supporting section 62A and the supporting section 63 of the connection member 6 extend toward the backward side, and thus the rotational axis 3A extends in parallel to the right and left direction on the rear side in comparison to the rear surface of the casing 12 of the image display device 11. In other words, the rotational axis 3A is disposed on the rear side in comparison to a rear end of the casing 12 of the image display device 11. The second ball joint 3 can rotate the image display device 11 with respect to the connection fixture 9 in a state in which the rotational axis 3A is set as a supporting point.

A force of pressing the second contact sections 321C and 322C to the second sphere section 31B varies in accordance with the degree of screwing of the second lid section 321 to the second accommodation section 322, in other words, a distance between the bottom section 322A of the second accommodation section 322 and the bottom section 321A of the second lid section 321. As the bottom section 321A approaches the bottom section 322A, the force of pressing the second contact sections 321C and 322C to the second sphere section 31B increases. In this case, static torque between the second sphere section 31B and the second contact sections 321C and 322C also increases. Furthermore, the static torque between the second sphere section 31B and the second contact sections 321C and 322C corresponds to torque capable of holding the image display device 11 by the second ball joint 3 in a case of changing a direction of the image display device 11 with respect to the connection fixture 9. Accordingly, a user can adjust the static torque between the second sphere section 31B and the second contact sections 321C and 322C by adjusting the degree of screwing of the second lid section 321 with respect to the second accommodation section 322. Hereinafter, the static torque between the second sphere section 31B and the second contact sections 321C and 322C is described as F2 (unit: N·m). Furthermore, as described above, r2 (refer to FIG. 4) that is the diameter of the second sphere section 31B and r1 (refer to FIG. 4) that is the diameter of the first sphere section 21B satisfy a relationship of r1>r2. In addition, R2 (refer to FIG. 5) that is the inner diameter of the side section 321B of the second lid section 321, and R1 (refer to FIG. 5) that is the inner diameter of the side section 221B of the first lid section 221 satisfy a relationship of R1>R2. In this case, F2 becomes smaller than the static torque F1 between the first sphere section 21B and the first contact sections 221C and 222C. The reason for this is as follows.

Typically, in a ball joint, the magnitude of static torque, which is generated by a frictional force between a sphere section and a contact section, is approximately proportional to a diameter of the sphere section. The reason for this is because the frictional force, which generates the static torque, acts on a surface of the sphere section. Accordingly, in a case of the relationship of r1>r2, the first ball joint 2 and the second ball joint 3 are easily configured to satisfy the relationship of F1>F2. In addition, in a case of screwing a lid section to a ball joint accommodation section, as an inner diameter of a side section of the lid section increases, torque for rotation of the lid section also increases. Accordingly, even when an applied force is constant, as the inner diameter of the side section of the lid section increases, the lid section is strongly screwed to the accommodation section, and the static torque between the sphere section and the contact section becomes stronger. Accordingly, in a case of the relationship of R1>R2, the first ball joint 2 and the second ball joint 3 are easily configured to satisfy the relationship of F1>F2.

An assembly process of the HMD 1 at the time of shipment from the factory will be described in detail. The following processes are executed with respect to the second socket 32 of the second ball joint 3. First, in a state in which the second lid section 321 is fastened to the second accommodation section 322 with a predetermined fastening torque, a force is applied while holding the casing 12, and moving start torque is measured. Next, moving start torque is measured while changing the fastening torque of the second lid section 321. In addition, a fastening torque value when the moving start torque becomes desired F2 is determined. Then, the degree of screwing of the second lid section 321 with respect to the second accommodation section 322 is adjusted by using the fastening torque value that is determined. As described above, a plurality of the HMDs 1 in the assembly process are configured so that the static torque of the second ball joint 3 becomes F2.

Next, the following processes are executed with respect to the first socket 22 of the first ball joint 2. First, in a state in which the first lid section 221 is fastened to the first accommodation section 222 with a predetermined fastening torque, a force is applied while holding the connection fixture 9, and moving start torque is measured. Next, moving start torque is measured while changing the fastening torque of the first lid section 221. In addition, a fastening torque value when the moving start torque becomes desired F1 greater than F2 is determined. Then, the degree of screwing of the first lid section 221 with respect to the first accommodation section 222 is adjusted by using the fastening torque value that is determined. As described above, a plurality of the HMDs 1 in the assembly process are configured so that the static torque of the first ball joint 2 becomes F1 greater than F2.

Furthermore, in the above description, the fastening torque may be the number of rotations of the first lid section 221 or the second lid section 321. In addition, in the above description, a gap between the side section 322B and the second lid section 321 may be set so that a right end of a flange portion of the side section 322B and a left end of the second lid section 321 come into contact with each other when a predetermined fastening torque is applied by rotating the second lid section 321 in predetermined times. Similarly, a gap between the side section 222B and the first lid section 221 may be set so that a right end of a flange portion of the side section 222B and a left end of the first lid section 221 come into contact with each other when a predetermined fastening torque is applied by rotating the first lid section 221 in predetermined times.

<Optical Conditions of HMD 1>

Figure 11:
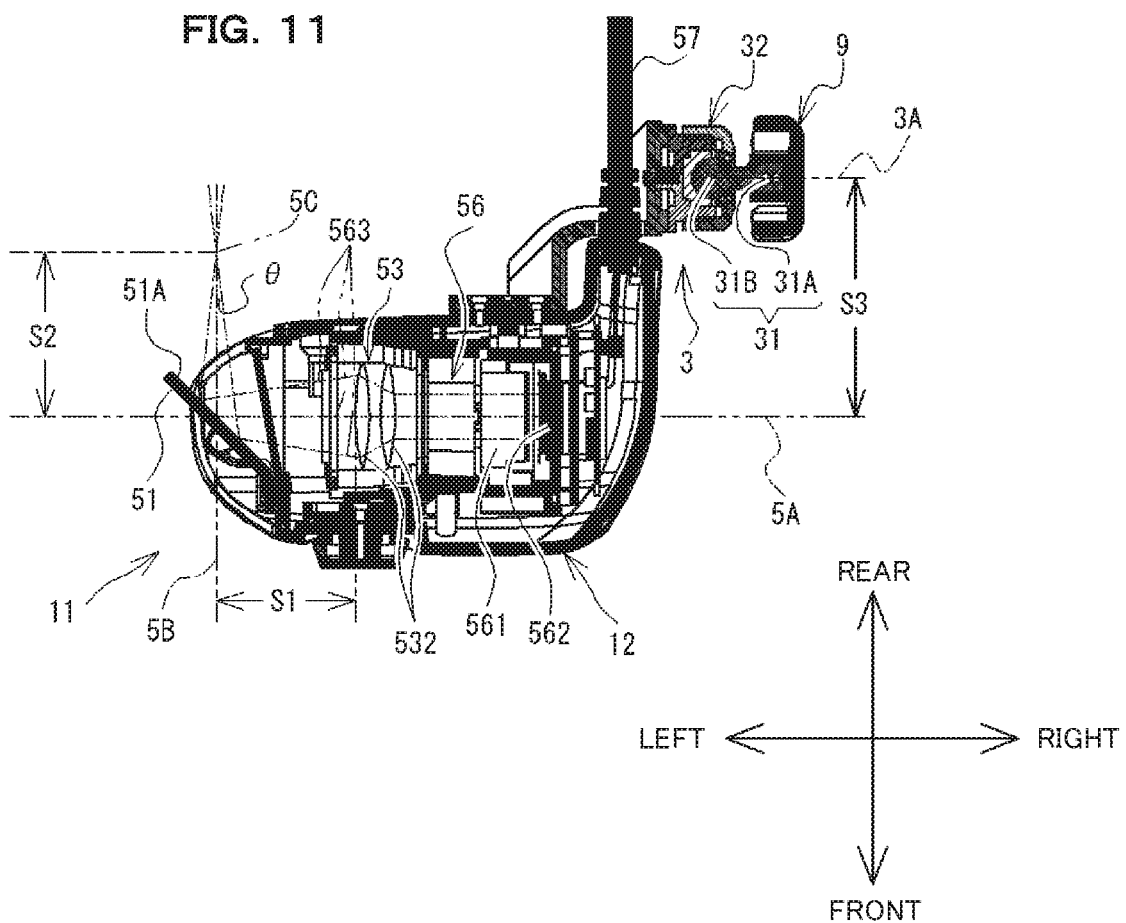
FIG. 11 is a cross-sectional view taken along the line VIII-VIII from the arrow direction in FIG. 1.

Description will be given of optical conditions of the image light that is emitted from the HMD 1 with reference to FIG. 11. In an optical axis of the image light emitted from the liquid crystal panel 562 of the image light unit 56, a line segment 5A, which extends along a portion along the right and left direction, that is, a portion that is transmitted through the plurality of lens 532 in the lens unit 53, is defined. In the optical axis of the image light, a line segment 5B, which extends along a portion after being reflected by the half mirror 51, is defined. A length between a left end of a lens 532, which is the closest to the half mirror 51, among the plurality of lens 532 and the line segment 5B in the right and left direction is defined as S1. A length between a position 5C of an exit pupil of the image light reflected by the half mirror 51 and the line segment 5A in the front and rear direction is defined as S2. Furthermore, in a case of the HMD 1, a diameter of the exit pupil is approximately 3 mm. A length between the rotational axis 3A and the line segment 5A in the front and rear direction is defined as S3. An angle made by an end of the image light reflected by the half mirror 51 and the optical axis is defined as a variation angle θ. In a case of the HMD 1, the variation angle θ is 9°. Furthermore, in FIG. 11, a plurality of lines 563, which reach the position 5C of the exit pupil through the plurality of lenses 532 and the half mirror 51, represent a main light beam of the image light. In the HMD 1, S1+S2 becomes 30 mm, and S3 becomes approximately 33.4 mm. Accordingly, S3 is always greater than S2.

<Operation Overview of HMD 1>

Description will be given of an operation overview of the HMD 1. First, a user wears the mounting fixture 8 of the HMD 1 on the head. The user performs positional adjustment in order for the half mirror 51 to be disposed in front of a left eye while holding the image display device 11 with a left hand. Output of image data from an external device (not illustrate) is initiated. As illustrated in FIG. 8, the control substrate 564 receives image data through the signal line of the communication line 57. The control substrate 564 displays an image in accordance with the received image data on the liquid crystal panel 562. Image light of the image, which is displayed on the liquid crystal panel 562, is transmitted through the glass substrate 561 to the left side, and is emitted from the image light unit 56 to the left side. The image light, which is emitted from the image light unit 56, is transmitted through the plurality of lenses 532 of the lens unit 53 to the left side, and is emitted from the holding member 531 to the left side. The half mirror 51 reflects the image light, which is emitted from the lens unit 53, to the rear side. The image light is incident to the left eye of the user. In addition, the half mirror 51 allows external light, which is incident from the front side, to be transmitted therethrough to the rear side. According to this, the user recognizes a virtual image in a state in which the virtual image overlaps on the landscape in front of the image display device 11 of the HMD 1.

When the user rotates the operation member 54 to perform focus adjustment, the adjustment mechanism 55 rotates in accordance with the rotation of the operation member 54. The lens unit 53 moves in the right and left direction in accordance with the rotation of the adjustment mechanism 55. Furthermore, when the lens unit 53 moves in the right and left direction, a spread angle of the image light, which becomes a virtual image to be confirmed with the eye of the user, varies due to the plurality of lenses 532. Accordingly, the user can perform focus adjustment by rotating the operation member 54.

<Effect>

As described above, the HMD 1 is worn on the user in a state in which the first section 81 of the mounting fixture 8 comes into contact with the frontal region of the user, and the second sections 82 and 83 of the mounting fixture 8 comes into contact with the temporal regions of the user. In this case, the image display device 11 is held in front of the left eye of the user by the connection fixture 9. In this state, image light, which is formed in the image light unit 56, is incident to the half mirror 51 from the surface 51A side. The image light is reflected to the rear side by the half mirror 51, and is incident to the left eye of the user from the front side. According to this, the HMD 1 can present an image to the user.

As described above, the image display device 11 is rotatably supported by the second ball joint 3 in front of the left eye of the user. When the image display device 11 rotates, the rotational axis 3A extends in parallel to the right and left direction and is disposed on the rear side in comparison to the rear end of the casing 12 of the image display device 11. Accordingly, in accordance with rotation of the image display device 11 in a state in which the rotational axis 3A is set as a supporting point, the image display device 11 changes an emission direction of the image light in the upper and lower direction on the front side in comparison to the rotational axis 3A. In this case, a variation amount of an arrival position of the image light on a surface of the user's face in accordance with a variation of an emission direction of the image light from the image display device 11 becomes smaller in comparison to a case where the rotational axis 3A intersects the casing 12. Accordingly, in a case where the user rotates the image display device 11 so as to adjust an incidence angle of the image light with respect to the left eye, the image light is likely to be continuously incident to the left eye. The user can easily adjust the incidence angle of the image light with respect to the left eye.

In the HMD 1, the connection member 6 is connected to the rear surface of the casing 12 of the image display device 11. The first supporting section 62A of the connection member 6 extends from the rear surface of the casing 12 to the backward side. The second socket 32 of the second ball joint 3 is provided on the right lateral surface of the supporting section 63 that further extends to the rear side in comparison to the rear end of the first supporting section 62A. Accordingly, in the HMD 1, it is possible to make the image light unit 56 and the half mirror 51 which are provided in the casing 12 of the image display device 11, and the rotational axis 3A be appropriately spaced away from each other in the front and rear direction by the connection member 6.

In the HMD 1, the communication line 57, which is connected to the casing 12, passes through the hole 621 provided in the second supporting section 62B of the connection member 6 in the front and rear direction. The first connection portion 622A is disposed on the upper side in comparison to the upper end of the communication line 57. The second connection portion 622B is disposed on the lower side in comparison to the lower end of the communication line 57. The third connection portion 622C is disposed on the left side in comparison to the left end of the communication line 57. The fourth connection portion 622D is disposed on the right side in comparison to the right end of the communication line 57. In this case, the connection member 6 can maintain a position of the communication line 57 in the upper and lower direction and the right and left direction.

The first sphere section 21B of the first ball joint 2 can rotate in an arbitrary direction through sliding with respect to the first contact sections 221C and 222C. The second sphere section 31B of the second ball joint 3 can rotate in an arbitrary direction through sliding with respect to the second contact sections 321C and 322C. In this case, in the HMD 1, it is possible to easily locate the position of the image display device 11 to an arbitrary position desired to the user by the first ball joint 2 and the second ball joint 3.

The static torque F2 is smaller than the static torque F1. The static torque F2 is static torque between the second sphere section 31B of the second ball joint 3 and the second contact sections 321C and 322C. The static torque F1 is static torque between the first sphere section 21B of the first ball joint 2 and the first contact sections 221C and 222C. In this case, when the user moves the image display device 11 while holding the casing 12, movement of the image display device 11 with respect to the connection fixture 9 becomes easier in comparison to movement of the connection fixture 9 with respect to the mounting fixture 8. Accordingly, the user can move the image display device 11 by preferentially using the second ball joint 3. The user can easily adjust the emission direction of the image light in the upper and lower direction by easily rotating the image display device 11 in a state in which the rotational axis 3A is set as a supporting point.

In the HMD 1, the length S3 is longer than the length S2. S3 is a length between the line segment 5A on the optical axis of the image light along the right and left direction and the rotational axis 3A in the front and rear direction. S2 is a length between the line segment 5A and the position of the exit pupil in the front and rear direction. In this case, when the image display device 11 is disposed so that the position of the exit pupil and a pupil position of the left eye of the user are aligned, the rotational axis 3A is disposed on the rear side in comparison to the pupil. Accordingly, in the HMD 1, a position of the rotational center of an eyeball of the left eye, and a position of the rotational axis 3A in the front and rear direction can be made to approach each other. Furthermore, in a case where the position of the rotational center of the eyeball and the position of the rotational axis 3A in the front and rear direction approach each other, it is easy for the user to confirm an image, which appears by the image light emitted from the image display device 11 to the backward side, with the eye only through vertical movement of the left eye. Accordingly, in a case where the image display device 11 rotates in a state in which the rotational axis 3A is set as a supporting point, the HMD 1 can allow the user to easily confirm the image.

Modification Example

Figure 12:
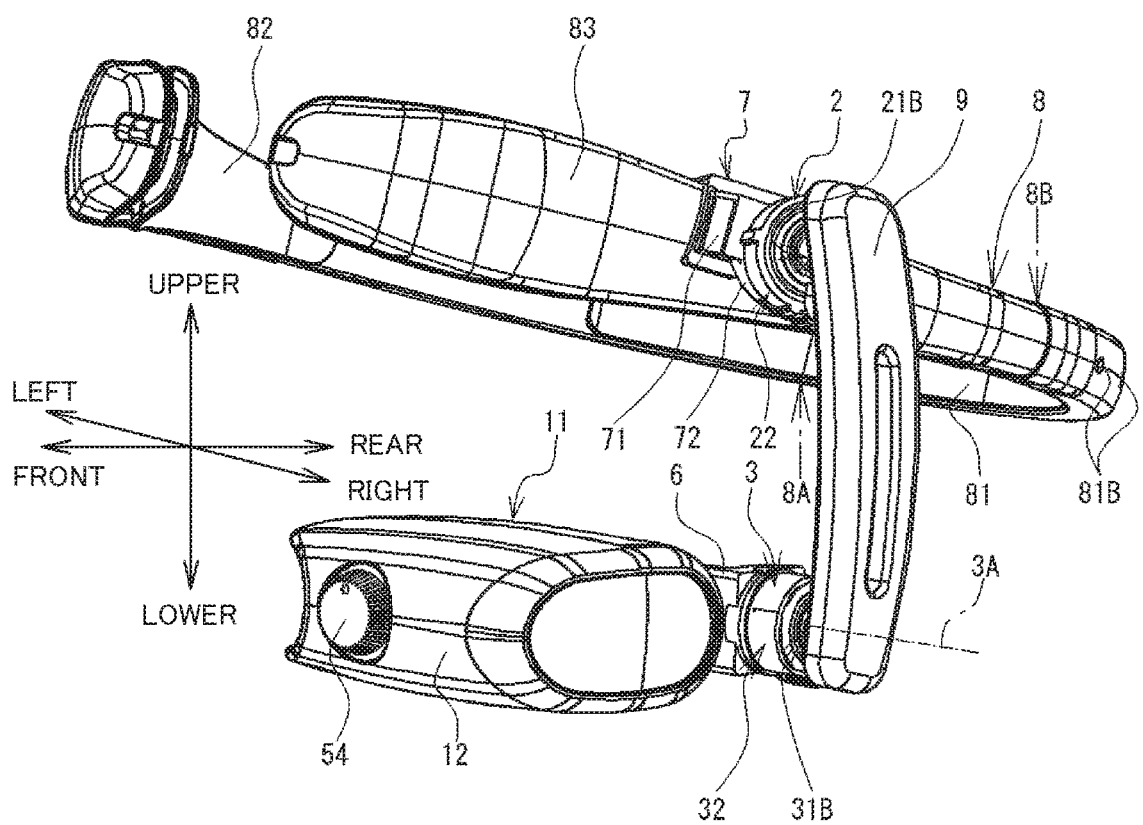
FIG. 12 is a perspective view of an HMD 10 in a modification example.

Furthermore, the present disclosure is not limited to the above-described embodiment, and various modifications can be made. The direction of the mounting fixture 8 in above-described embodiment, and the mounting position and the mounting direction of the connection member 7 with respect to the mounting fixture 8 can be changed. Description will be given of an HMD 10 that is an aspect of a modification example of the present disclosure with reference to FIG. 12. In the HMD 10, the first section 81 of the mounting fixture 8 extends between the position 8A and the position 8B in the right and left direction, and is curved in a backwardly convex shape. The second section 82 extends from the position 8A to the forward side. The second section 83 extends from the position 8B to the forward side. The second sections 82 and 83 extend in a direction in which front ends thereof approach each other. The mounting fixture 8 is worn on the head of the user in a state in which the first section 81, and the second sections 82 and 83 are respectively brought into contact with the occipital region, the left temporal region, and the right temporal region of the user.

The connection section 71 of the connection member 7 is connected to the mounting fixture 8 at a portion both on the right side in comparison to the center in the right and left direction and on the front side in comparison to the center in the front and rear direction, in other words, a part of the second section 83. Differently from the above-described embodiment, the connection section 71 is connected to a portion that is different from the portions, at which the two holes 81A and 81B are provided, of the mounting fixture 8. Accordingly, the connection member 7 is not fixed by the two screws which are inserted to any one side of the two holes 81A and the two holes 81B.

The connection fixture 9 extends in the upper and lower direction. An upper end of the connection fixture 9 is connected to the mounting fixture 8 through the first ball joint 2 and the connection member 7. A lower end of the connection fixture 9 is connected to the image display device 11 through the second ball joint 3 and the connection member 6. The image display device 11 is mounted to the mounting fixture 8 by the connection fixture 9. The connection fixture 9 holds the image display device 11 at a position that is spaced away from the mounting fixture 8. The connection fixture 9 can dispose the half mirror 51 of the image display device 11 in front of the left eye of the user in a state in which the mounting fixture 8 is worn on the head of the user. In the second neutral state, the rotational axis 3A, which extends along the second rod section 31A of the second ball joint 3, is disposed on the rear side in comparison to the rear surface of the casing 12 of the image display device 11. The configurations of the connection fixture 9, the connection members 6 and 7, the first ball joint 2, the second ball joint 3, and the image display device 11 are the same as in the case of the HMD 1 in the above-described embodiment, and thus description thereof will be omitted.

In the above-described embodiment, the mounting fixture 8 may have an annular shape. That is, in the second sections 82 and 83, ends on sides opposite to sides at which the second sections 82 and 83 are connected to the first section 81 may be connected to each other. In addition, the mounting fixture 8 may be worn on the head of the user in a state in which in second sections 82 and 83, positions of the ends on sides opposite to sides at which the second sections 82 and 83 are connected to the first section 81 are disposed on the left side or the right side of the head of the user.

In the above-described embodiment, the first accommodation section 222 of the first ball joint 2 is connected to the right end of the circular column section 72 of the connection member 7. The first accommodation section 222 may be directly connected to the mounting fixture 8. The second accommodation section 322 of the second ball joint 3 is connected to the right end surface of the supporting section 63 of the connection member 6. The second accommodation section 322 may be directly connected to the casing 12.

In the above-described embodiment, the communication line 57 passes through the hole 621 of the second supporting section 62B of the connection member 6, and thus the first connection portion 622A, the second connection portion 622B, the third connection portion 622C, and the fourth connection portion 622D are disposed at least in the vicinity of the upper side in comparison to the upper end of the communication line 57, in the vicinity of the lower side in comparison to the lower end of the communication line 57, in the vicinity of the left side in comparison to the left end of the communication line 57, and in the vicinity of the right side in comparison to the right end of the communication line 57. In contrast, the hole 621 of the second supporting section 62B may be slit that is long in the right and left direction. That is, the first connection portion 622A may be disposed on the upper side in comparison to the upper end of the communication line 57, and the second connection portion 622B may be disposed on the lower side in comparison to the lower end of the communication line 57. Disposition in the vicinity of the left side in comparison to the left end, and in the vicinity of the right side in comparison to the right end may not be made.

The hole 621 may not be provided in the second supporting section 62B. That is, the second supporting section 62B may be provided with only the first connection portion 622A and the second connection portion 622B, and may not be provided with the third connection portion 622C and the fourth connection portion 622D. That is, the second supporting section 62B may be disposed only in the vicinity of the upper side in comparison to the upper end of the communication line 57 and in the vicinity of the lower side in comparison to the lower end of the communication line 57. In the above-described embodiment, the communication line 57 may be directly connected to the casing 12 without being inserted into the casing 12. The diameter of the hole 621 of the second supporting section 62B of the connection member 6 may be approximately the same as the diameter of the clad of the communication line 57. The clad of the communication line 57 and the hole 621 may be in contact with each other.

In the above-described embodiment, the first ball joint 2 may be rotatable in a state in which only a rotational axis extending along the first rod section 21A in the first neutral state is set as a supporting point. The second ball joint 3 may be rotatable in a state in which only the rotational axis 3A extending along the second rod section 31A in the second neutral state is set as a supporting point.

In the above-described embodiment, the first rod section 21A of the first ball stud 21 of the first ball joint 2 is fitted to the fitting section 91 in the upper end of the connection fixture 9, and the second rod section 31A of the second ball stud 31 of the second ball joint 3 is fitted to the fitting section 92 in the lower end of the connection fixture 9. The first ball stud 21 and the second ball stud 31 are provided in the connection fixture 9. On the other hand, the first accommodation section 222 of the first socket 22 is connected to the circular column section 72 of the connection member 7, and the second accommodation section 322 of the second socket 32 is connected to the supporting section 63 of the connection member 6. In contrast, the first ball stud 21 may be provided in the circular column section 72 of the connection member 7. Specifically, the first rod section 21A of the first ball stud 21 may extend from the right end of the circular column section 72 to the right side. The first accommodation section 222 of the first socket 22 may be connected to the upper end of the connection fixture 9. The second ball stud 31 may be provided in the supporting section 63 of the connection member 6. Specifically, the second rod section 31A of the second ball stud 31 may extend from the right end surface of the supporting section 63 toward the right side. The second accommodation section 322 of the second socket 32 may be connected to the lower end of the connection fixture 9.

Furthermore, in the above-described embodiment, the first rod section 21A of the first ball joint 2 may be displaceable in an arbitrary direction. Consideration is made to a virtual plane including a trajectory of the first rod section 21A of the first ball joint 2 that displaces in an arbitrary direction. At this time, it can be considered that the first ball joint 2 rotates around a rotational axis that is parallel to the normal line of the virtual plane. Accordingly, the first ball joint 2, which can rotate in an arbitrary direction, can rotate with two or greater rotational degrees of freedom. In contrast, another member, which rotatably supports the connection fixture 9 with respect to the mounting fixture 8 with two or greater rotational degrees of freedom may be used instead of the first ball joint 2. In addition, the second rod section 31A of the second ball joint 3 may be displaceable in an arbitrary direction. Consideration is made to a virtual plane including a trajectory of the second rod section 31A of the second ball joint 3 that displaces in an arbitrary direction. At this time, it can be considered that the second ball joint 3 rotates around a rotational axis that is parallel to the normal line of the virtual plane. Accordingly, the second ball joint 3, which can rotate in an arbitrary direction, can rotate with two or greater rotational degrees of freedom. In contrast, another member which rotatably supports the image display device 11 with respect to the connection fixture 9 with two or greater rotational degrees of freedom, may be used instead of the second ball joint 3. For example, a rubber joint may be used instead of the first ball joint 2 and the second ball joint 3. In addition, a hinge having two or greater rotational axes may be used.

In the above-described embodiment, the static torque F2 between the second sphere section 31B and the second contact sections 321C and 322C is set to be smaller than the static torque F1 between the first sphere section 21B and the first contact sections 221C and 222C. In contrast, F1 and F2 may be set to the same as each other, or F2 may be set to be greater than F1.

In the above-described embodiment, S3, which is the length between the line segment 5A on the optical axis of the image light along the right and left direction, and the rotational axis 3A in the front and rear direction, may be set to be smaller than S2 that is the length between the line segment 5A and the position of the exit pupil in the front and rear direction.

In the above-described embodiment, in the first ball joint 2, the first contact sections 221C and 222C come into contact with the first sphere section 21B. In contrast, the first ball joint 2 may not be provided with the first contact sections 221C and 222C, and each of the first lid section 221 and the first accommodation section 222 may directly come into contact with the first sphere section 21B. In the second ball joint 3, the second contact sections 321C and 322C come into contact with the second sphere section 31B. In contrast, the second ball joint 3 may not be provided with the second contact sections 321C and 322C, and each of the second lid section 321 and the second accommodation section 322 may directly come into contact with the second sphere section 31B.

In the above-described embodiment, the HMD 1 may have a configuration in which the mounting fixture 8 is not provided. The connection section 71 of the connection member 7 may be directly mounted to a member other than the mounting fixture 8 that is worn on the head. In addition, the HMD 1 may have a configuration in which the mounting fixture 8 and the connection member 7 are not provided. The first accommodation section 222 of the first socket 22 of the first ball joint 2 may be directly mounted to a member other than the mounting fixture 8 that is worn on the head. Specific examples of the member other than the mounting fixture 8 that is worn on the head include a hair band, a hat, eyeglasses, and the like. In the above-described embodiment, the image display device 11 is held in front of the left eye of the user, but the image display device 11 may be held in front of the right eye of the user.

It is noted that, as used herein and in the appended claims, the singular forms "a", "an", and "the" include plural referents unless the context clearly dictates otherwise.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims. Further, in the present specification and the attached claims, any item described in the singular includes such items in the plurality unless indicated specifically in the context.

What is claimed is:

1. A head-mounted display, comprising:
    a mounting fixture including a first section that extends in a first direction and is curved in a convex shape toward one side in a second direction perpendicular to the first direction, and a pair of second sections which extend in a direction of approaching each other from both sides of the first section toward another side in the second direction;
    an image display device including at least an image light unit that generates image light and is capable of emitting the image light to one side in the first direction along the first direction, a deflection member that deflects the image light emitted from the image light unit to the other side in the second direction, and a casing that covers the image light unit and the deflection member;
    a connection fixture that is a member that mounts the image display device to the mounting fixture, and extends in a third direction perpendicular to the first direction and the second direction;
    a first connection member that connects a portion, which is on another side in the first direction in comparison to a center in the first direction and on the one side in the second direction in comparison to a center in the second direction, of an outer surface opposite to a surface on a side surrounded by the first section and the pair of second sections, and the connection fixture to each other; and
    a second connection member that connects the image display device and the connection fixture, and at least rotatably supports the image display device with respect to the connection fixture in a state in which a specific rotation axis, which extends in the first direction and is disposed on the other side in the second direction in comparison to the image display device, is set as a supporting point,
    wherein the first connection member rotatably supports the connection fixture with respect to the mounting fixture with two or more rotational degrees of freedom,
    wherein the second connection member rotatably supports the image display device with respect to the connection fixture with two or more rotational degrees of freedom including the specific rotational axis,
    wherein the first connection member includes a first ball joint,
    wherein the first ball joint includes a first ball stud including a first rod section that extends from one side of the mounting fixture and the connection fixture, a first sphere section that is provided in a front end of the first rod section, and a first socket that is provided on another side of the mounting fixture and the connection fixture, and comes into contact with at least a part of the first sphere section to slidably support the first sphere section,
    wherein the second connection member includes a second ball joint, and
    wherein the second ball joint includes a second ball stud including a second rod section that extends from one side of the image display device and the connection fixture, a second sphere section that is provided in a front end of the second rod section, and a second socket that is provided on another side of the image display device and the connection fixture, and comes into contact with at least a part of the second sphere section to slidably support the second sphere section.

2. The head-mounted display according to claim 1, wherein
    the image display device includes a connection member that extends from an end of the casing on the other side in the second direction toward the other side in the second direction, and
    the second connection member rotatably supports the connection member to the connection fixture.

3. The head-mounted display according to claim 2, further comprising:
    a cable that extends from the casing,
    wherein the connection member includes a first connection portion that is disposed on one side in the third direction with respect to at least a portion of the cable, and a second connection portion that is disposed on another side in the third direction.

4. The head-mounted display according to claim 1, wherein static torque capable of holding the image display device by the second connection member in a case where the image display device rotates with respect to the connection fixture is smaller than static torque capable of holding the connection fixture by the first connection member in a case where the connection fixture rotates with respect to the mounting fixture.

5. The head-mounted display according to claim 1, wherein a distance between an optical axis of the image light along the first direction and the specific rotational axis is greater than a distance between the optical axis and a position of an exit pupil of the image light.

6. A head-mounted display, comprising:
    an annular mounting fixture;
    an image display device including at least an image light unit that generates image light and is capable of emitting the image light to one side in a first direction along the first direction, a deflection member that deflects the image light emitted from the image light unit to one side in a second direction, and a casing that covers the image light unit and the deflection member;
    a connection fixture that is a member that mounts the image display device to the annular mounting fixture, and extends in a third direction perpendicular to the first direction and the second direction;
    a first connection member that connects a portion of the annular mounting fixture on another side in the first direction in comparison to a center in the first direction and on another side in the second direction in comparison to a center in the second direction, and the connection fixture to each other; and
a second connection member that connects the image display device and the connection fixture to each other, and at least rotatably supports the image display device with respect to the connection fixture in a state in which a specific rotational axis, which extends in the first direction and is disposed on the one side in the second direction in comparison to the image display device, is set as a supporting point,
wherein the first connection member rotatably supports the connection fixture with respect to the annular mounting fixture with two or more rotational degrees of freedom,
wherein the second connection member rotatably supports the image display device with respect to the connection fixture with two or more rotational degrees of freedom including the specific rotational axis,
wherein the first connection member includes a first ball joint,
wherein the first ball joint includes a first ball stud including a first rod section that extends from one side of the annular mounting fixture and the connection fixture, a first sphere section that is provided in a front end of the first rod section, and a first socket that is provided on another side of the annular mounting fixture and the connection fixture, and comes into contact with at least a part of the first sphere section to slidably support the first sphere section,
wherein the second connection member includes a second ball joint, and
wherein the second ball joint includes a second ball stud including a second rod section that extends from one side of the image display device and the connection fixture, a second sphere section that is provided in a front end of the second rod section, and a second socket that is provided on another side of the image display device and the connection fixture, and comes into contact with at least a part of the second sphere section to slidably support the second sphere section.

7. A head-mounted display, comprising:
an image display device including at least an image light unit that generates image light and is capable of emitting the image light to one side in a first direction along the first direction, a deflection member that deflects the image light emitted from the image light unit to one side in a second direction perpendicular to the first direction, and a casing that covers the image light unit and the deflection member;
a connection fixture that is a member that mounts the image display device to a mounting fixture to be mounted on a user's head, and extends in a third direction perpendicular to the first direction and the second direction;
a first connection member that connects the mounting fixture and the connection fixture to each other; and
a second connection member that connects the image display device and the connection fixture to each other, and at least rotatably supports the image display device with respect to the connection fixture in a state in which a specific rotational axis, which extends in the first direction and is disposed on the one side in the second direction in comparison to the image display device, is set as a supporting point,
wherein the first connection member rotatably supports the connection fixture with respect to the mounting fixture with two or more rotational degrees of freedom,
wherein the second connection member rotatably supports the image display device with respect to the connection fixture with two or more rotational degrees of freedom including the specific rotational axis,
wherein the first connection member includes a first ball joint,
wherein the first ball joint includes a first ball stud including a first rod section that extends from one side of the mounting fixture and the connection fixture, a first sphere section that is provided in a front end of the first rod section, and a first socket that is provided on another side of the mounting fixture and the connection fixture, and comes into contact with at least a part of the first sphere section to slidably support the first sphere section,
wherein the second connection member includes a second ball joint, and
wherein the second ball joint includes a second ball stud including a second rod section that extends from one side of the image display device and the connection fixture, a second sphere section that is provided in a front end of the second rod section, and a second socket that is provided on another side of the image display device and the connection fixture, and comes into contact with at least a part of the second sphere section to slidably support the second sphere section.

* * * * *